US006182159B1

(12) United States Patent
Urabe

(10) Patent No.: US 6,182,159 B1
(45) Date of Patent: *__Jan. 30, 2001

(54) SYSTEM FOR DETACHABLY CONNECTING MEMORY CARDS WHICH PROVIDE MEMORY SPECIFIED BY PREDETERMINED RANGE OF ADDRESSES REGISTERED IN LIST AND UPDATING LIST INDEPENDENT OF THE I/O OPERATION

(75) Inventor: Akio Urabe, Tokyo (JP)

(73) Assignee: Ricoh Company, Ltd., Tokyo (JP)

( * ) Notice: Under 35 U.S.C. 154(b), the term of this patent shall be extended for 0 days.

This patent is subject to a terminal disclaimer.

(21) Appl. No.: 09/357,499

(22) Filed: Jul. 20, 1999

Related U.S. Application Data

(63) Continuation of application No. 08/715,548, filed on Sep. 19, 1996, now Pat. No. 5,974,472.

(30) Foreign Application Priority Data

Sep. 19, 1995 (JP) .................................................. 7-265014
Jul. 8, 1996 (JP) .................................................. 8-197128

(51) Int. Cl.⁷ ............................. G06F 13/10; G06F 13/16
(52) U.S. Cl. .................................. 710/2; 710/3; 710/102; 710/103; 711/5; 711/115; 711/163; 711/218
(58) Field of Search ..................................... 710/2, 3, 102, 710/103; 711/5, 115, 163, 218

(56) References Cited

U.S. PATENT DOCUMENTS

| 5,119,486 | | 6/1992 | Albonesi | 395/425 |
|---|---|---|---|---|
| 5,287,531 | * | 2/1994 | Rogers, Jr. et al. | 395/800 |
| 5,301,343 | | 4/1994 | Alvarex | 395/800 |
| 5,357,621 | * | 10/1994 | Cox | 395/400 |
| 5,432,916 | | 7/1995 | Hahn et al. | 395/325 |
| 5,615,352 | * | 3/1997 | Jacobson et al. | 395/441 |
| 5,623,618 | | 4/1997 | Brewer et al. | 395/402 |
| 5,632,020 | | 5/1997 | Gephardt et al. | 395/283 |
| 5,644,731 | * | 7/1997 | Liencres et al. | 395/283 |
| 5,649,121 | | 7/1997 | Budman et al. | 395/281 |
| 5,678,018 | | 10/1997 | Chin et al. | 395/403 |

FOREIGN PATENT DOCUMENTS 59-92482   5/1984   (JP) .
2-110098   9/1990   (JP) .

OTHER PUBLICATIONS

Article (In Japanese) entitled "A Summary of the Most Recent PC Card Standard," in Interface, Jun. 1995, pp. 89–95.

* cited by examiner

Primary Examiner—Thomas C. Lee
Assistant Examiner—Rehana Perveen
(74) Attorney, Agent, or Firm—Knoble & Yoshida, LLC

(57) ABSTRACT

The disclosure of the current invention describes the methods and systems for inputting and outputting to and from the large capacity memory cards which are used as external data storage and expanded random access memory.

21 Claims, 9 Drawing Sheets

FIG. 1A
FIG. 1B
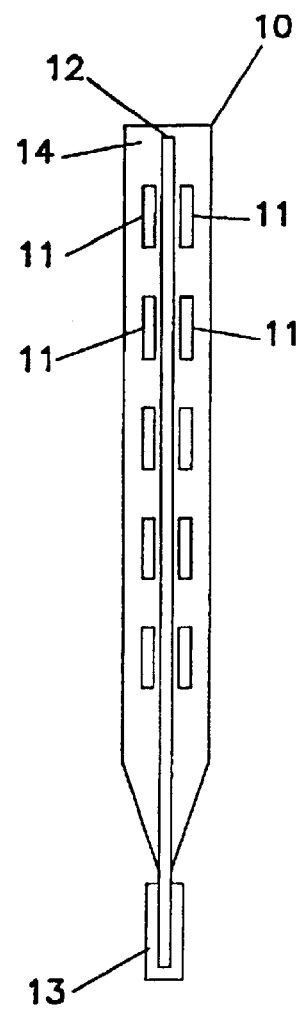
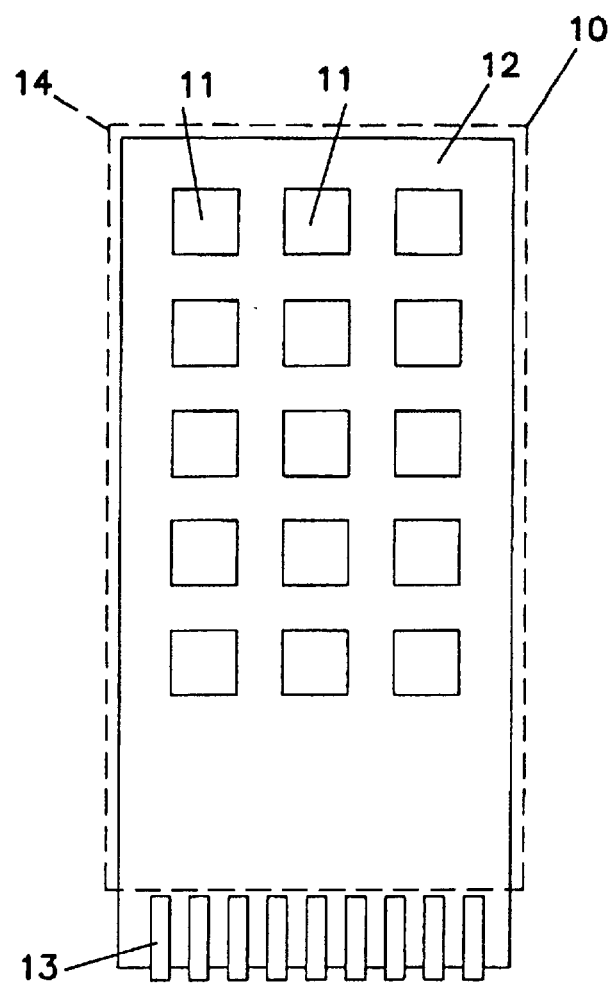

FIG. 2A
FIG. 2B
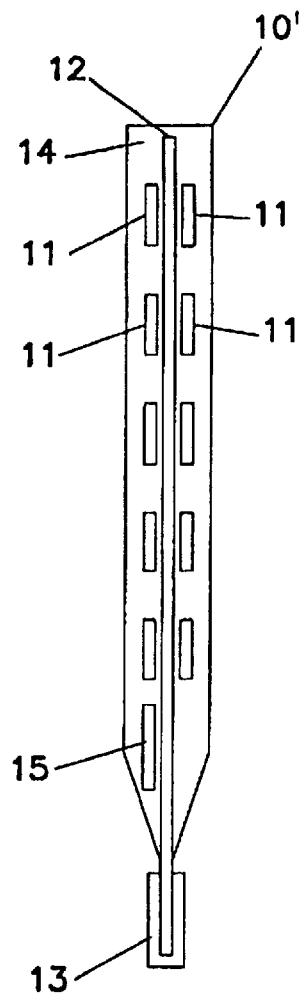
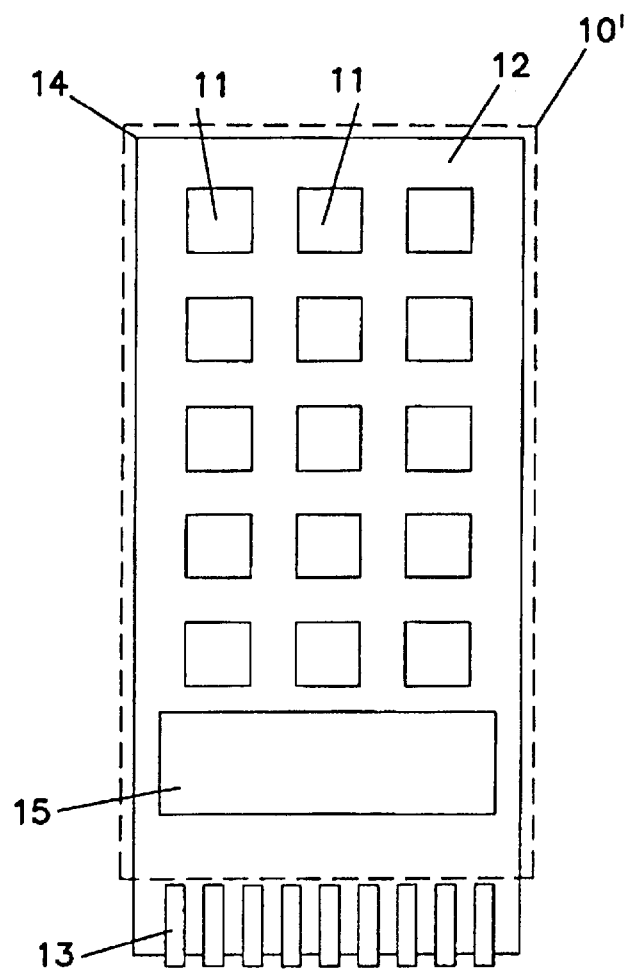

| SLOT NO. | CARD TYPE |
|---|---|
| 1 | "11" MEMORY |
| 2 | "12" FONT |
| ⋮ | ⋮ |
| M | "ff" NOT IN SLOT |

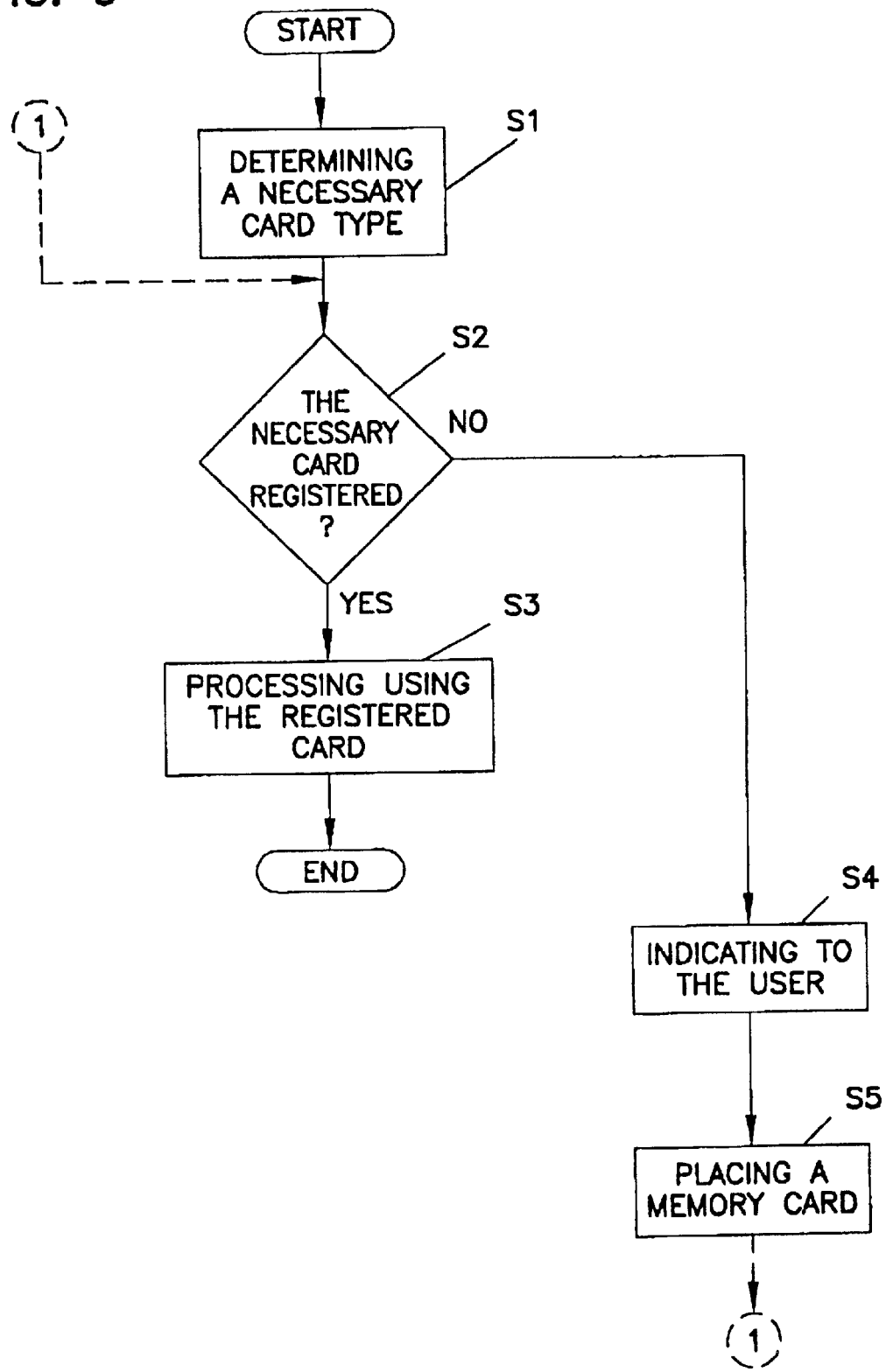

SYSTEM FOR DETACHABLY CONNECTING MEMORY CARDS WHICH PROVIDE MEMORY SPECIFIED BY PREDETERMINED RANGE OF ADDRESSES REGISTERED IN LIST AND UPDATING LIST INDEPENDENT OF THE I/O OPERATION

This is a continuation of Ser. No. 08/715,548 filed on Sep. 19, 1996, now U.S. Pat. No. 5,974,472.

FIELD OF THE INVENTION

The current invention is generally related to large capacity memory cards, and more particularly related to the methods and systems for inputting and outputting to and from the large capacity memory cards which are used as external data storage and expanded random access memory.

BACKGROUND OF THE INVENTION

As the use of personal computers became versatile, the memory size requirements have increased. Not only the physical but also external memory such as a floppy disk is required to hold mega bytes of information. However, the certain use of computer graphics and high-fidelity audio in the multi-media computing requires an even larger memory capability in memory devices. For example, a CD-ROM (Compact Disk Read Only Memory) disk stores approximately 600 mega byte of data. Other large capacity memory media include DVD (Digital Video Disk) for storing animation data, a DAT (Digital Audio Tape) for storing digital audio and a MD (Mini-Disk) for storing digital data.

To use these different media, a specific input and output (I/O) device is necessary for each medium. For example, a CD-ROM drive is required to access data stored on a CD-ROM while a DVD drive is necessary to access data from a DVD. In addition to these specific hardware, specific software interface is also necessary. As the term multi-media indicates, the various I/O devices and interfaces are unavoidable in a certain computer systems, and these specific I/O devices add complexity to a computer system.

In addition to the specific I/O requirements, the above described media also have various data formats. The same information is stored in a different format based upon a medium where the information is stored. Furthermore, to make the matter more complicated, within the same application area such as computer graphics, even if the same medium is used, there are numerous data formats to store the same graphic image. Although various data formats are not always easy to manage, conversion programs generally allow sharing of the same data.

In order to eliminate the above described problems associated with the multi-media, a single memory medium has been considered. Such a memory medium has to offer a number of advantages including a large memory capacity, fast access, flexibility and versatility. In view of these considerations, a PC memory card has great potential for the above enumerated desirable characteristics.

Among other things, PC cards have the following advantages when they are used as memory cards: Firstly, the memory cards do not require a specific I/O drive. This is a significant advantage since a memory card does not require any substantial mechanical parts such as a motor and a movable head. Because of the motor less access, many control mechanisms are also unnecessary. Secondly, because no head contacts the memory storage surface, the medium is free from mechanical damage. Thirdly, the memory access is faster since no moving part must be physically moved to access a certain portion of the memory. Although no single memory card does not yet have the memory capacity comparable to a CD-ROM, the memory capacity limitation of a memory card has been steadily improved. For example, the use of bear memory chips helps the chip density on a memory card, and the memory capacity of a memory chip is currently increasing at a rate of four times every three years.

The use of the PC cards have steadily increasing with portable computing. Some commercially available PC cards are used as a portable data storage unit. For example, the memory is a ROM for storing information such as fonts for printers and audio such as music as disclosed in Japanese Patent 59-92482. Other commercially available PC cards are used as devices rather than a memory storage. For example, fax modem cards or communication cards have been widely used for Internet access.

To support the above described various functions performed by the PC cards, Japanese Utility Model Patent 2-110098 discloses that each PC card has two separate memory areas. One is a general purpose area where program code or data is stored to perform a predetermined function. The other memory area is an attribute or configuration memory area where information or identification of the card is stored, and the attribute memory area is accessible only when a predetermined signal is enabled. The above described two-memory area configuration is standardized in the interface protocols such as PCMCIA (Personal Computer Memory Card International Association), JEIDA (Japanese Electronics Industry Development Association) as well as PC Card Standard (1995), which is jointly developed by PCMCIA and JEIDA. Also, see "A Summary of the Most Recent PC Card Standard" in Japanese, PP89-95, Interface, June, 1995. The two independent memory design is not efficient way of managing input/output of these PC cards especially when a plurality of memory cards is to be managed. Furthermore, the same address value is not unique in the above two-tier memory design. Depending upon the status of the predetermined signal, the same address resides in either of the two address areas. These address related issues are particularly important when a PC card is used as an expanded RAM device or a ROM data storage device.

To solve the above and other problems and improve the management of the PC cards, there has been a need for efficient memory card management systems and methods.

SUMMARY OF THE INVENTION

To solve the above and other problems, according to one aspect of the current invention, a method of inputting and outputting to and from a memory card in a computer, includes the steps of: a) detachably placing the memory card in a slot for providing memory specified by a range of addresses while the computer is operating; b) accessing a portion of the memory in the memory card by specifying one of the addresses; and c) performing an input/output operation at the specified address in the step b).

According to a second aspect of the current invention, a method of managing a plurality of memory cards in a computer, includes the steps of: a) detachably connecting one of the memory cards in a slot for providing memory specified by a range of addresses and a type while the computer is operating; b) maintaining a list of connected memory cards and the corresponding type; c) accessing a portion of the memory in the memory card by specifying one of the addresses; and d) performing an input/output operation at the specified address in the step c).

According to a third aspect of the current invention, a memory card includes a plurality of memory chips providing single contiguous memory space addressable within a predetermined range of addresses for storing information, a portion of the memory space storing certain predetermined information at least including a type of the memory card; and an address decoder connected to each of the memory chips for selectively activating one of the memory chips for an input and output operation based upon a specified one of the addresses.

According to a fourth aspect of the current invention, a system for managing a plurality of memory units in a computer, includes: memory cards for providing additional memory each specified by a range of addresses, the memory cards detachably connectable to the computer without rebooting the computer; a card connection maintenance unit for maintaining information on the connected memory cards and the corresponding type; and an address decoder for activating a portion of the memory in one of the memory cards specified by one of the addresses so as to perform a specified input/output operation at the specified address.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 1A and 1B respectively illustrate a cross sectional view and a top view of a first preferred embodiment of a memory card according to the current invention.

FIGS. 2A and 2B respectively illustrate a cross sectional view and a top view of a second preferred embodiment of a memory card according to the current invention.

FIG. 9 illustrates a first preferred process of managing inputs and outputs of a plurality of memory cards according to the current invention.

DETAILED DESCRIPTION OF THE PREFERRED EMBODIMENT(S)

Figure 3E:
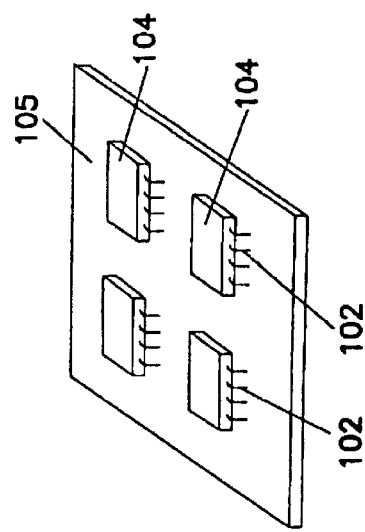
FIGS. 3A through 3E respectively illustrate various stages of manufacturing a memory card using packaged memory chips.

Referring now to the drawings, wherein like reference numerals designate corresponding structure throughout the views, and referring in particular to FIG. 1A, a top view of one preferred embodiment of a memory card 10 according to the current invention is illustrated. In general, the memory card 10 is used along with a computer system to access or store information from memory chips 11. Although physical, electrical as well as interface standards exist in the industry, the memory cards do not have to comply with these standards to practice the current invention. Furthermore, the memory chips 11 can be read-only memory (ROM), random-access memory (RAM) or a combination of both to practice the current invention. As described above, the memory card 10 can be used as an external ROM storage unit from which stored data is read, as an expanded RAM for expanding physical memory or as a secondary data storage unit for writing information. The total memory capacity or size of the memory card generally depends upon the memory capacity and the physical size of the individual chips 11.

Still referring to FIG. 1A, one preferred embodiment of the memory card 10 according to the current invention has a non-conductive housing portion 14 for protecting the memory chips 11 and a circuit board 12 as well as a connector portion 13 for providing conductive connections. A plurality of the memory chips 11 are connected with each other on the circuit board 12 to provide a single continuous memory space. Each memory location in the contiguous memory space is addressable by a unique address inputted into the card 10. In this embodiment, the input address does not require further processing and is used directly to access a particular memory location.

Referring to FIG. 1B, a cross sectional view of the preferred embodiment of the memory card 10 as described with respect to FIG. 1A is illustrated. The preferred embodiment mounts fifteen individual memory chips 11 on each side of the circuit board 12 for increasing the storage capacity per card. The memory chips 11 in the preferred embodiment are bear chips so that the height of these chips 11 is minimal when they are mounted on both sides of the circuit board 12. As will be later described, the bear chips mounting technology saves space to pack more memory chips in a card.

Now referring to FIGS. 2A and 2B, a top view and a cross sectional view of a second preferred embodiment of the memory card according to the current invention are respectively illustrated. In general, the memory card 10' is similar to the first embodiment as described with respect to FIGS. 1A and 1B. Since the components of the same reference numerals between the first and the second embodiments are substantially identical, the above descriptions of these components are not reiterated but incorporated herein. However, the second embodiment has an additional component, a memory controller 15 onboard the card 10'.

Still referring to FIGS. 2A and 2B, the onboard memory controller 15 generally serves as an interface between individual memory chips 11 and a computer system in which the memory card is detachably connected. The memory controller 15 includes at least an address decoder for decoding a given address specified by a computer so as to enable one of the individual memory chips on the card 10'. The decoding of address is generally limited to an address range of the memory space defined by the plurality of the individual chips 11. In other words, based upon a specified type of memory and a specified extensive unique address, a particular memory card is selected. The extensive unique address also specifies a slot in which the memory card is plugged in. The addressing scheme will be later described in more details.

Figure 3C:
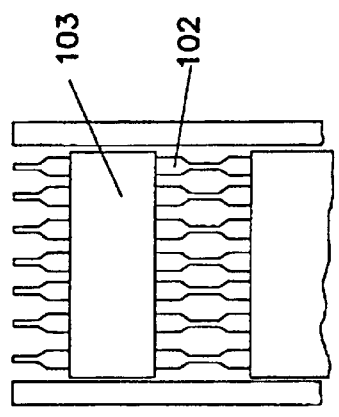
Figure 3D:
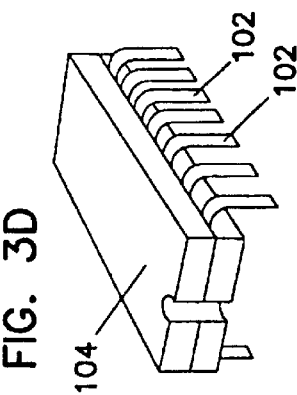
Figure 3A:
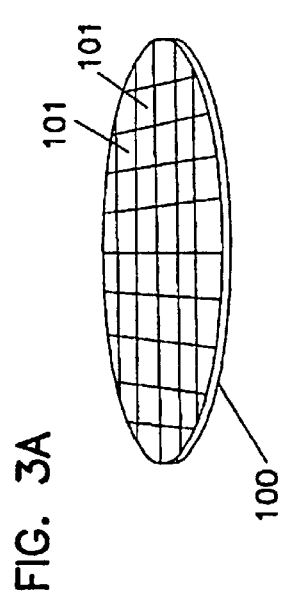
Figure 3B:
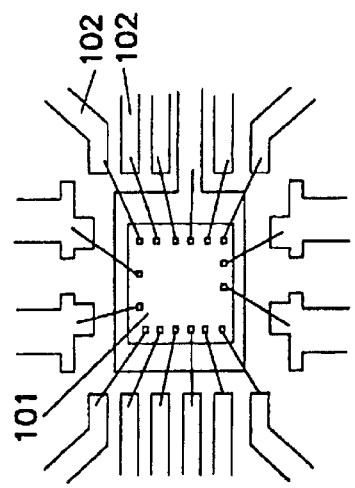

Now referring to FIGS. 3A–3E, in order to manufacture the above described memory cards according to the current invention, bear chips as opposed to packaged chips as shown in FIG. 3D are used to increase the memory capacity of the cards. After conductive wafer 100 is manufactured as shown in FIG. 3A, chips 101 are separated, and these bear chips are tested without packaging. On the other hand, the packaged chips require the connection between a chip 101 and a lead frame 102 as shown in FIG. 3B and a mold frame 103 in which a bear chip is placed as shown in FIG. 3C. Although the packaged memory chips are fully tested and usually more reliable in their performance, because of their packing, for the same memory capacity, they occupy more physical space than bear chips as shown in FIG. 3E.

Figure 4:
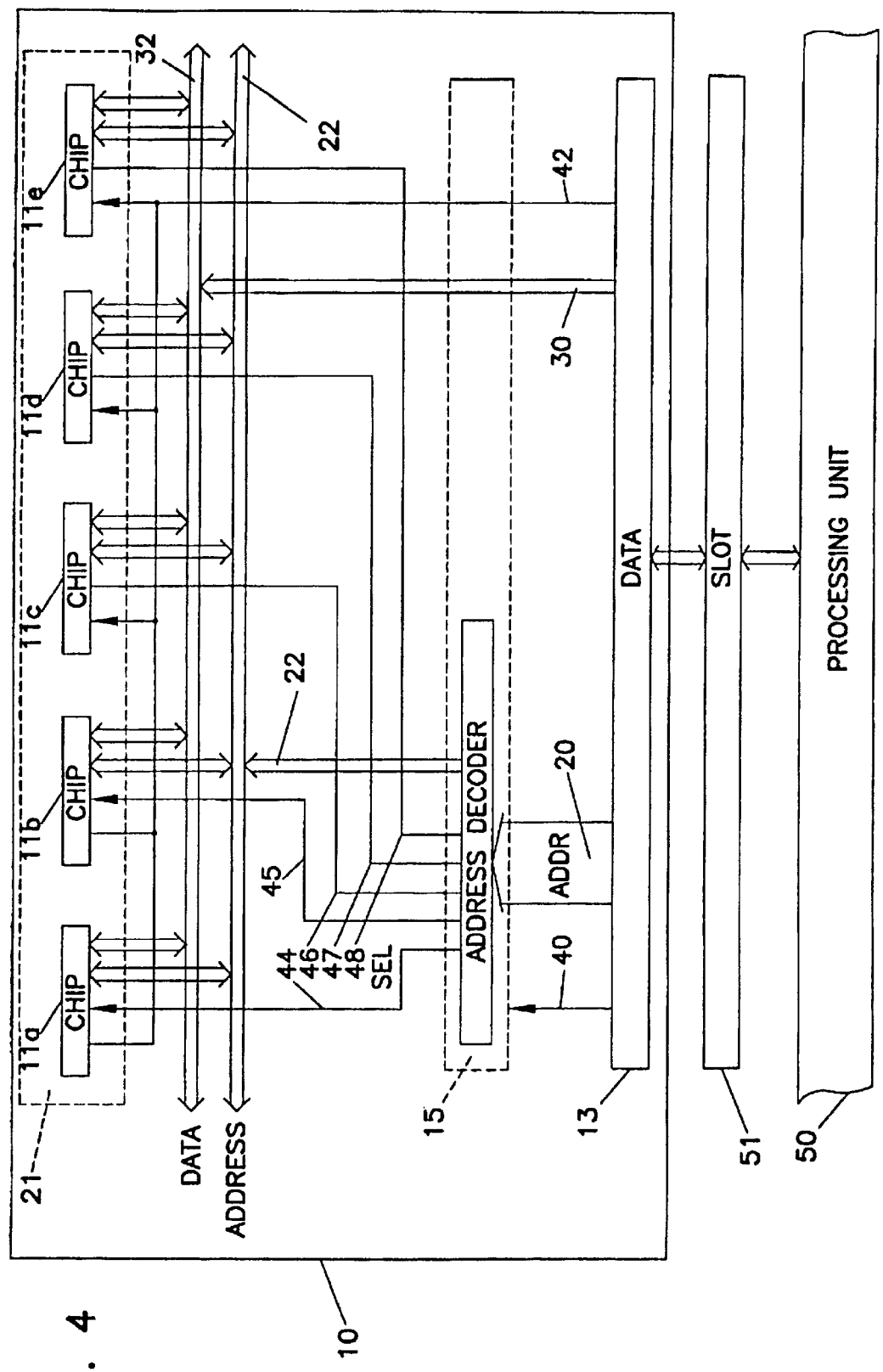
FIG. 4 is a block diagram of a first preferred embodiment of the memory card system according to the current invention.

Referring to FIG. 4, one preferred embodiment of the memory card input and output system according to the current invention inputs and outputs information to and from a memory card 10 based upon the instructions from a processing unit 50. The memory card 10 has a connector 13 at one end, and the connector 13 plugs into a slot 51 to make connection for an address bus 20 and a data bus 30 as well as other signal lines. Both data and address information reaches a memory area 21 via another pair of a second address bus 22 and a second data bus 32, which connect individual memory chips 11a–11e in the memory area 21. These memory chips 11a–11e provide a contiguous single memory area represented by contiguous memory addresses. For example, if a memory card has p memory chips and each of memory chips has k addressable locations, contiguous k×p addresses are available on the card. To determine which memory chip to be accessed based upon a given address, upon receiving a clock selection signal via a CSL line, an address decoder receives address information via the address bus 20. The address decoder 15 enables one of the selection control line 44–48 to specify a particular memory chip which contains the decoded address. The specified memory location is now accessible via the data buses 30 and 32 for a read or write operation specified by a R/W signal 42.

Still referring to FIG. 4, an alternative preferred embodiment of the memory card 10 according to the current invention includes writable RAM memory chips such as flush RAM chips or low-voltage battery operated RAM chips. If the alternative preferred embodiment includes RAM chips, the memory access is accomplished based upon the SCSI interface. To support the storage function, the alternative preferred embodiment also includes a battery to maintain the information when the memory cards are removed from a regular battery source. The above described memory card is a high-speed memory access device which does not include a motor-driven disk drive. Because of the motor-less access, the electric consumption for this memory medium is reduced during the I/O operations. In addition, due to the friction-free access, the medium is less likely to be damaged during the I/O operation than the other disk-based media.

Figure 5:
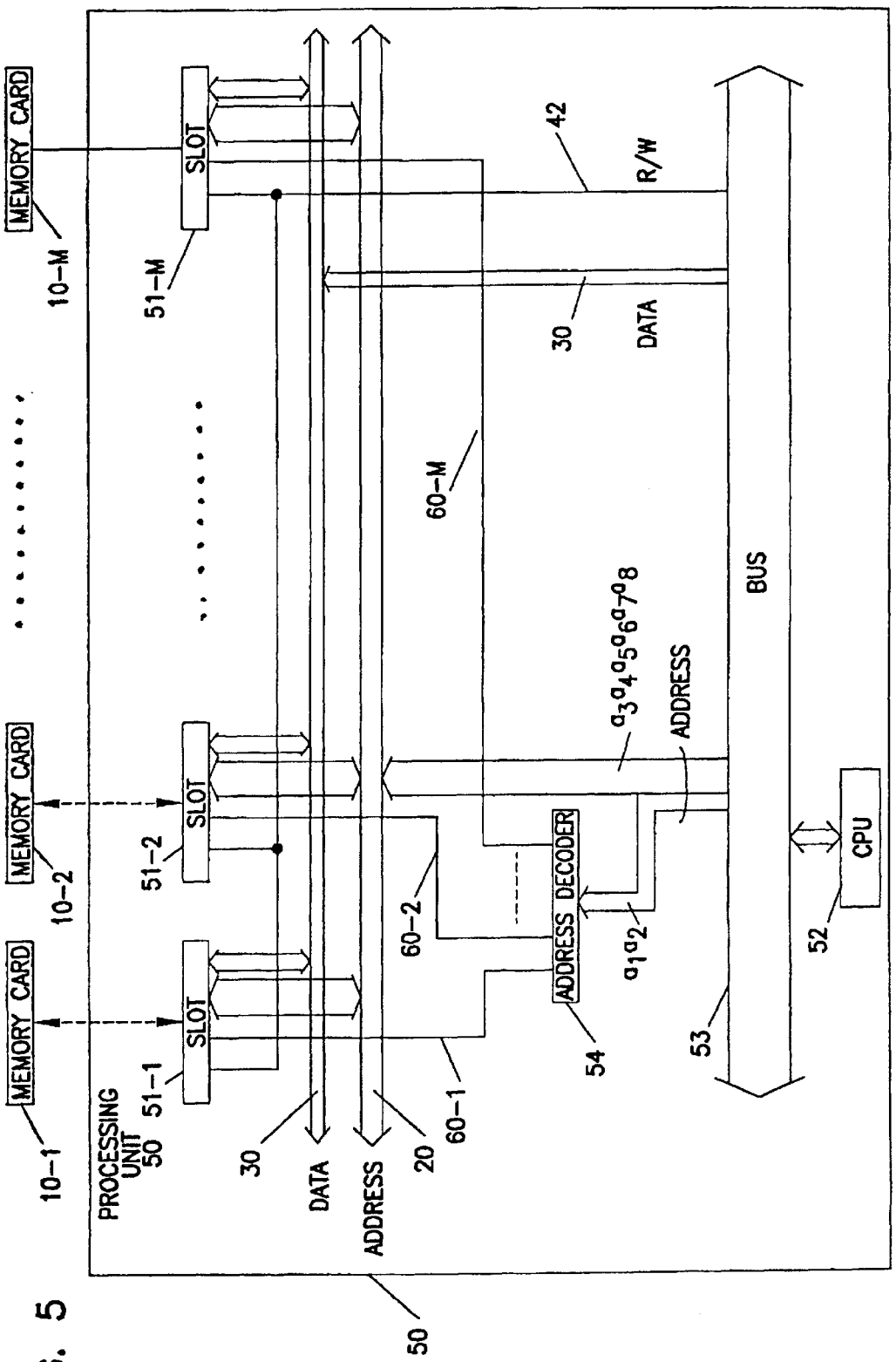
FIG. 5 is a block diagram of a second preferred embodiment of the memory card system for managing inputs and outputs of a plurality of memory cards according to the current invention.

Now referring to FIG. 5, a second preferred embodiment of the memory card input and output system according to the current invention manages the inputs and outputs of a plurality of memory cards 10-1 through 10-M. Each of the memory card 10A through 10N has a connector at one end and plugs into any one of slots 51-1 through 51-M located on a processing unit 50. The plugged memory card makes electrical connections with an address bus 20 and a data bus 30 as well as other signal lines. In general, based upon an address specified by a central processing unit (CPU) 52 of a processing unit 50, an address decoder 54 selects an appropriate memory card by enabling one of enabling one of the slots 51-1 through 51-M via a slot selection signal(SSL) 60-1 through 60-M. When a card is not placed in the selected slot, the CPU 52 is capable of detecting the missing card. Unlike the above described first preferred embodiment, a single common address decoder 54 exists in the processing unit 50. Each of the memory cards 10A through 10N has a plurality of memory chips as described with respect to FIGS. 1A and 1B.

Still referring to FIG. 5, each of the slots 51-1 through 51-m is designated a predetermined range of contiguous address space. Each of the memory cards 10-1 through 10-M includes a predetermined number of memory chips for providing a contiguous single memory area which has the same address size of each slot. For example, if each memory card has N addresses, the first slot 51-1 is assigned to the first address range from X to X+N-1, the second slot 51-2 is assigned to the second address range from X+N to X+2N-1, and the M-th slot 51-M is assigned to the M-th address range from X+(M-1)N to X+MN-1 where X is an arbitrary address including 0. Thus, M memory cards provide a contiguous memory address space ranging from X to X+MN. Assuming a 8-bit address and each bit is respectively designated by $a_1$, $a_2$, $a_3$, $a_4$, $a_5$, $a_6$, $a_7$ and $a_8$, according to one preferred embodiment, the two most significant bits $a_1$ and $a_2$ specify a particular slot while the rest $a_3$, $a_4$, $a_5$, $a_6$, $a_7$ and $a_8$ specify a particular location. To access a particular memory location, the address decoder 54 thus decodes the slot address and enables one of slot select signals SSL 60-1 through 60-M of the selected slot. The enabled slot also receives a read or write signal 42 prior to performing an input/output operation. The remaining address bits are used to access a particular memory location of the card connected to the enabled slot via an address bus 20. These expanded memory locations are immediately available to the CPU 52 without rebooting the system or re-configuring a configuration files.

Still referring to FIG. 5, a plurality of the memory cards 10-1 through 10-M provides the single contiguous memory space and supports a multiple data formats such as CD-ROM, DVD and so on. For example, the first memory card 10-1 contains graphics data in the CD-ROM format while the second memory card 10-2 contains other animation graphics data in the DVD format. Furthermore, some memory cards are used as an expanded RAM for processing while other memory cards contain program code for performing certain predetermined device functions such as a fax modem. In order to manage these various types of data formats as well as devices on the memory cards, a predetermined memory range of each card is reserved for a certain information.

Figures 6, 8:
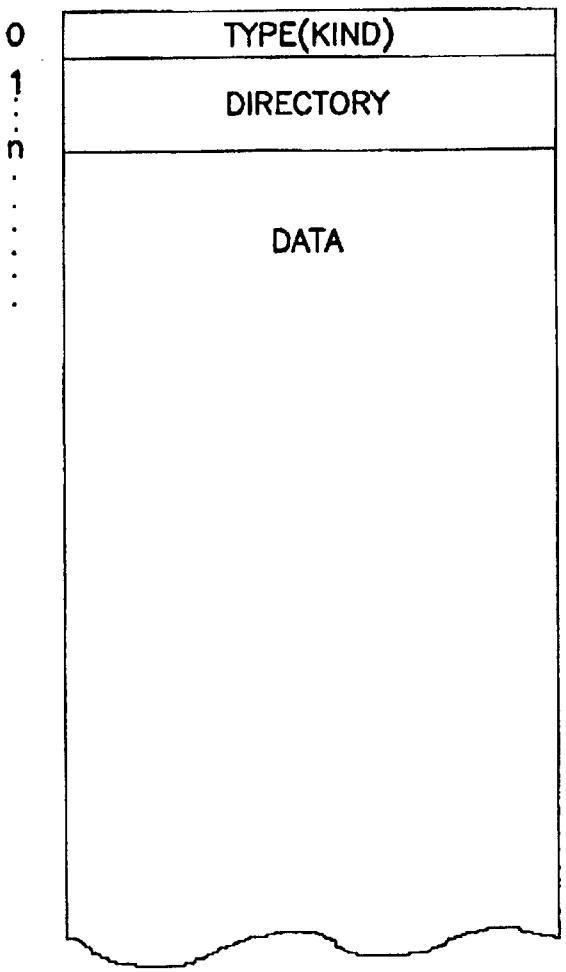
FIG. 6 is an exemplary memory configuration of a memory card according to the current invention.
FIG. 8 illustrates the exemplary information in the table unit for managing inputs and outputs of a plurality of memory cards according to the current invention.
Figure 7:
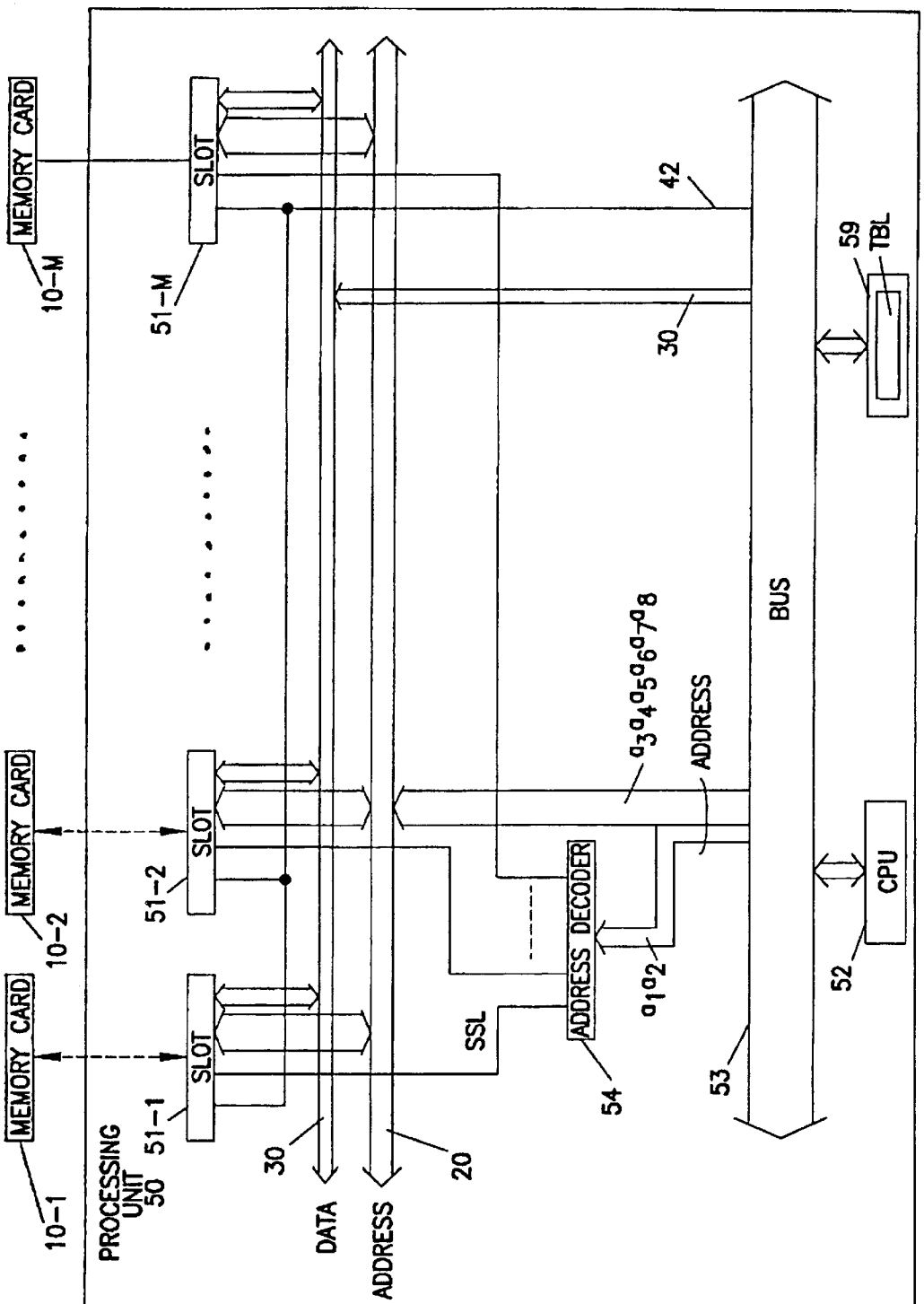
FIG. 7 is a block diagram of a third preferred embodiment of the memory card system for managing inputs and outputs of a plurality of memory cards based upon a card table unit according to the current invention.

Referring to FIG. 6, in order to manage the I/O of a plurality of PC cards, one preferred embodiment of the PC cards according to the current invention includes a predetermined memory block which ranges from a first addressable memory location to n-th memory location of each memory card. Although a plurality of memory cards form a contiguous memory space, according to the preferred embodiment, since a certain memory range of each card is used for the system I/O functions, not all of the addressable memory locations are available for an application program. The reserved memory block of the preferred embodiment contains certain predetermined information such as a format of the data, a device function and a file directory. For example, the data format type indicates whether the memory card contains CD-ROM compatible information. The file directory contains information such as the file size, the file location, and so on of individual files residing on the memory card. The above card information is returned upon a predetermined command from a CPU with a parameter specifying a particular slot. One example of such a command is "ab000000" where "ab" specifies a particular slot while "000000" specifies the beginning address of the reserved memory block containing the above described card information. Now referring to FIG. 7, a third preferred embodiment of the memory card input and output system according to the current invention manages the inputs and outputs of a plurality of memory cards 10-1 through 10-M. Since the third preferred embodiment is substantially the same as the second preferred embodiment as described with respect to FIG. 5, the descriptions of the identically referenced components are not reiterated and are incorporated herein. The advantages of the third preferred embodiment include a table unit 59 which efficiently manages the I/O functions of a plurality of the memory cards. The table unit 59 keeps track of the memory cards connected to the system for the I/O tasks. Each of the connected cards is registered with the table unit 59.

The table unit 59 updates the information on multiple cards in response to certain predetermined events such as hardware and software interrupts. For example, when a system is powered on, the registration process is initiated by an interrupt. Similarly, the insertion of a card into a slot causes a hardware interrupt to invoke the registration process. When the registered card is plugged out from the slot, an update process is invoked to update the card information in the table. Software interrupts initiate certain processes. For example, prior to performing a certain I/O functions, a software interrupt causes an inquiry process as to whether a card is connected to a certain slot, as to whether the card is a certain type and so on. Another software interrupt is caused by a timer to invoke a periodic registration process.

Referring to FIG. 8, the table unit 59 updates a table of information containing the type of each card and the associated slot number. One preferred embodiment of the table is a series of special registers. Another preferred embodiment of the table is a certain predetermined memory block. In either embodiment, the table includes information at least on a type of a PC card and its associated slot number. For example, the table as shown in FIG. 8 indicates that slot No. 1 has a memory card whose type is coded as 11 while slot No. 2 has a font card whose type is coded as 12. Although the rest of the entries, slots No.3 through M-1 is not illustrated, slot No. M indicates "ff" which signifies that the slot is not occupied by a card. These information is updated in response to predetermined events as described above.

The above described input and output card management system has various application areas in modularizing optional functions. For example, printers, facsimile machines and copiers each have various options such as fonts, printer simulation and an additional memory storage. Modules including these options are currently installed in the devices. The above described cards replace these modules, and the inserting these cards into slots provided on the image reproduction machines completes the installation. Such easy installation allows the user to later add on the options without the installation personnel.

Now referring to FIG. 9, according to the current invention, one preferred process of managing inputs and outputs of a plurality of memory cards involves the following steps. Although not clearly shown in FIG. 9, a registration list is initially generated for memory cards that are attached to the system. The registration list is periodically updated independent of I/O requests. Assuming that an I/O is requested in connection with a memory card, in a step S1, a type of card involved in the request is determined. For example, the type includes a RAM memory type, a ROM memory type, and so on. After the requested card type is determined, a step S2 ascertains as to whether the requested card type is currently registered with the system by comparing against the registration list. If the requested card type is not currently registered in the system, a user is notified of the missing card in a step S4. One preferred method of indicating the missing card involves a warning display on a monitor and or an audible message through a speaker. In a step S5, a user is given an opportunity to insert the missing card into a slot to register without rebooting the system or re-configuring a configuration file. After waiting for a predetermined time for the user to insert a card in the step S5, the control is transferred to a point before the step S2 to repeat the step S2. If the missing card is not inserted in the slot and the I/O request continues, the above described loop is repeated until either the missing card is registered or the I/O request is canceled. When the requested card is inserted, although FIG. 9 does not illustrate steps, the registration update process is executed so that the step 2 can ascertain the registration of the requested card.

Still referring to FIG. 9, the step S2 returns an associated slot number to a CPU if the requested card type is currently registered with the system. The CPU performs the requested I/O task on the card connected to the returned slot number in the step S3. As described above, in this preferred process, a requesting party does not have to know which card slot the desired card is connected and let alone if the desired card is even registered in the system. The preferred process is responsible for ascertaining the conditions necessary for executing the requested I/O task.

Figure 10:
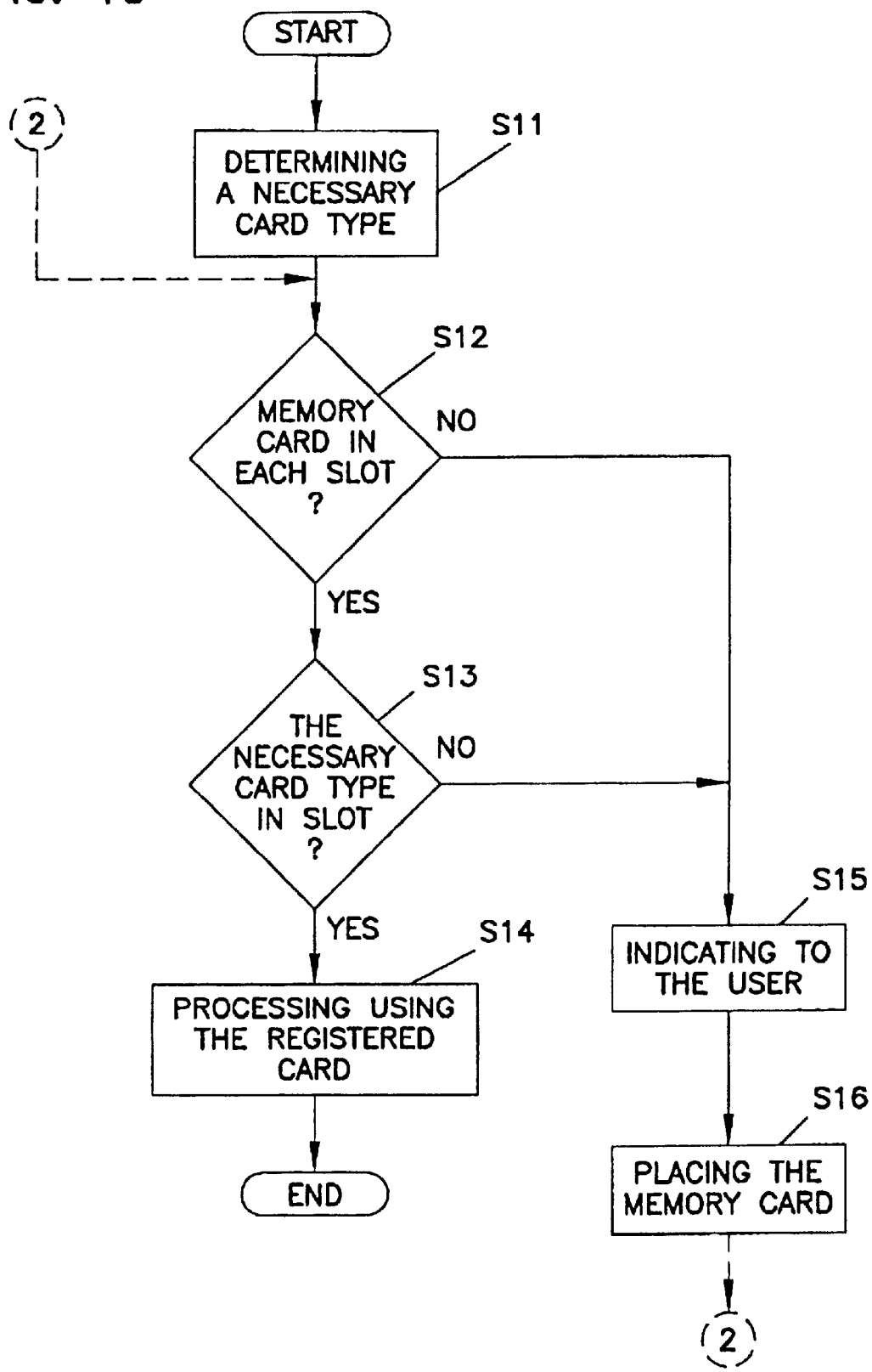
FIG. 10 illustrates a second preferred process of managing inputs and outputs of a plurality of memory cards according to the current invention.

Now referring to FIG. 10, according to the current invention, a second preferred process of managing inputs and outputs of a plurality of memory cards enables flexible attachments and detachments of the cards. Assuming that an I/O is requested in connection with a memory card, in a step S11, a type of card involved in the request is determined as described above for the first preferred process. After the requested card type is determined, steps S12 and S13 ascertain as to whether the requested card type is currently registered with the system by checking every card slot in the system. In contrast to the first preferred process as described with respect to FIG. 9, the second preferred process performs the above described card availability check every time an I/O request is made. If the requested card type is not currently registered in the system, a user is notified of the missing card in a step S15. One preferred method of indicating the missing card involves a warning display on a monitor and or an audible message through a speaker. In a step S16, a user is given an opportunity to insert the missing card into a slot to register without rebooting the system or re-configuring a configuration file. After waiting for a predetermined time for the user to insert a card in the step S15, the control is transferred to a point before the step S12 to repeat the step S12. If the missing card is not inserted in the slot and the I/O request continues, the above described loop is repeated until either the missing card is registered or the I/O request is canceled. When the requested card is inserted, although FIG. 10 does not illustrate steps, the registration update process is executed as if a new I/O request is made so that the steps 12 and 13 can ascertain the registration of the requested card.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

What is claimed is:

1. A method of inputting and outputting to and from a memory card in a computer, comprising the steps of:
   a) detachably placing the memory card in a slot for providing memory specified by a predetermined range of addresses while the computer is operating;
   b) automatically registering a slot number of said slot and a content format of information stored in the memory card;
   c) accessing a portion of said memory in the memory card by specifying one of said addresses;
   d) performing an input/output operation at said specified address in said step c);
   e) automatically updating the slot number and the content format independent of said input/output operation.

2. The method of inputting and outputting to and from a memory card according to claim 1 wherein the memory card provides additional storage memory space.

3. The method of inputting and outputting to and from a memory card according to claim 2 wherein the computer performs said input/output operating using a plurality of predetermined data formats.

4. The method of inputting and outputting to and from a memory card according to claim 3 wherein the computer only reads from said additional storage memory space.

5. The method of inputting and outputting to and from a memory card according to claim 1 wherein the computer in said step d) uses the memory card as expanded random-access memory space.

6. The method of inputting and outputting to and from a memory card according to claim 1 wherein the computer in said step d) uses the memory card as additional storage memory space as well as expanded random-access memory space.

7. A computer system for inputting and outputting information to and from a computer, comprising:
   a memory card for providing contiguous memory specified by a range of addresses, said memory card being detachably connectable with a slot without rebooting the computer;
   a central processing unit (CPU) located in the computer for automatically registering a slot number of said slot and a content format of information stored in the memory card and specifying an input/output operation at one of said addresses; and
   an address decoding unit connected to said memory card and said CPU for selectively activating said one address in the memory card so as to complete said input/output operation, wherein said CPU automatically updating the slot number and the content format independent of said input/output operation.

8. The computer system for inputting and outputting according to claim 7 wherein said memory card has additional storage memory space.

9. The computer system for inputting and outputting according to claim 8 wherein said additional storage memory space is read only.

10. The computer system for inputting and outputting according to claim 8 wherein said memory card has random-access memory space for said CPU.

11. The computer system for inputting and outputting according to claim 7 wherein said memory card has additional secondary storage memory space and expanded random-access memory space.

12. A memory card, comprising:
   a plurality of memory chips providing single contiguous memory space addressable within a predetermined range of addresses for storing information, a portion of said memory space storing certain predetermined information at least including a type of the memory card, said portion being directory storing information on data format type and availability of memory space; and
   an address decoder connected to each of said memory chips for selectively activating one of said memory chips for an input and output operation based upon a specified one of said addresses.

13. The memory card according to claim 12, wherein said memory chips are bear chips.

14. The memory card according to claim 13, wherein said memory chips are read-only memory chips.

15. The memory card according to claim 13, wherein said memory chips are random-access memory chips.

16. The memory card according to claim 12, further comprises a battery source for independently maintaining information stored in said random-access memory chips.

17. A method of inputting and outputting to and from a memory card in a computer, comprising the steps of:
   a) detachably placing the memory card in a slot for providing memory specified by a range of addresses while the computer is operating;
   b) accessing a portion of said memory in the memory card by specifying one of said addresses, said portion is a directory storing information on data format type and availability of memory space; and
   c) performing an input/output operation at said specified address in said step b).

18. A method of inputting and outputting to and from a memory card in a computer, comprising the steps of:
   a) detachably placing the memory card in a slot for providing memory specified by a predetermined range of addresses while the computer is operating;
   b) automatically registering a slot number of said slot and a content format of information stored in the memory card;
   c) accessing a portion of said memory in the memory card by specifying one of said addresses, said portion is a directory storing information on data format type and availability of memory space;
   d) performing an input/output operation at said specified address in said step c);
   e) automatically updating the slot number and the content format independent of said input/output operation.

19. A computer system for inputting and outputting information to and from a computer, comprising:
   a memory card for providing contiguous memory specified by a range of addresses, said memory card being detachably connectable with a slot without rebooting the computer, a portion of said portion is a directory storing information on data format type and availability of memory space;
   a central processing unit (CPU) located in the computer for automatically registering a slot number of said slot and a content format of information stored in the memory card and specifying an input/output operation at one of said addresses; and an address decoding unit connected to said memory card and said CPU for selectively activating said one address in the memory card so as to complete said input/output operation, wherein said CPU automatically updating the slot number and the content format independent of said input/output operation.

20. A method of inputting and outputting to and from a memory card in a computer, comprising the steps of:

a) detachably placing the memory card in a slot for providing memory specified by a predetermined range of addresses while the computer is operating;

b) automatically registering a slot number of said slot and a content format of information stored in the memory card;

c) attempting to access a portion of said memory in the memory card by specifying one of said addresses, said portion is a directory storing information on data format type and availability of memory space; and d) generating a signal indicative of absence of the memory card in response to said step c) if the memory card containing said specified portion of said memory is not in the slot.

21. A memory card, comprising:

at least one bear chip located on the memory card and providing single contiguous memory space addressable within a predetermined range of addresses for storing information, a portion of said memory space storing certain predetermined information at least including a type of the stored information, said portion is a directory storing information on data format type and availability of memory space; and an address decoder located on the memory card and connected to said bear chip for selectively accessing a specified address within said predetermined range of said addresses.

* * * * *